United States Patent
Andrews et al.

(12) 
(10) Patent No.: US 6,233,643 B1
(45) Date of Patent: May 15, 2001

(54) APPARATUS INCLUDING A HOST PROCESSOR AND COMMUNICATIONS ADAPTERS INTERCONNECTED WITH A BUS

(75) Inventors: Lawrence P. Andrews; Richard Clyde Beckman; Robert Chih-Tsin Eng, all of Boca Raton; Judith Marie Linger, Delray Beach; Joseph C. Petty, Jr., Boca Raton; John Claude Sinibaldi, Pompano Beach; Gary L. Turbeville, Boca Raton; Kevin Bradley Williams, Plantation, all of FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/338,611

(22) Filed: Jun. 23, 1999

Related U.S. Application Data

(62) Division of application No. 08/944,209, filed on Oct. 6, 1997, now Pat. No. 5,968,158.

(51) Int. Cl.[7] .............................. G06F 13/00; G06F 13/38
(52) U.S. Cl. ........................ 710/131; 710/20; 710/102; 710/129; 712/32; 712/35; 712/43; 709/217; 709/218; 709/219; 709/249; 709/250; 370/362; 370/463; 370/58.2; 379/93; 379/98; 379/97; 379/96
(58) Field of Search ................................ 710/260, 102, 710/20, 261, 48, 129, 131; 712/10, 14, 11, 15; 711/147; 370/362, 463; 379/93.06, 357, 284, 95, 96, 97, 98, 93; 709/249; 380/24, 4

(56) References Cited

U.S. PATENT DOCUMENTS

| | | | |
|---|---|---|---|
| 4,870,704 | * | 9/1989 | Matelan et al. ........................ 710/120 |
| 5,349,579 | * | 9/1994 | Madonna et al. ..................... 370/58.2 |
| 5,483,530 | * | 1/1996 | Davis et al. ............................ 370/79 |
| 5,495,485 | * | 2/1996 | Hughes-Hartogs ............... 370/110.1 |
| 5,497,373 | * | 3/1996 | Hulen et al. ............................ 370/79 |
| 5,524,252 | * | 6/1996 | Desai et al. .............................. 712/1 |
| 5,553,293 | * | 9/1996 | Andrews et al. ..................... 710/261 |
| 5,577,105 | * | 11/1996 | Baum et al. ............................ 379/93 |
| 5,592,625 | * | 1/1997 | Sandberg ............................. 711/147 |
| 5,671,251 | * | 9/1997 | Blackwell et al. ................... 375/222 |
| 5,815,505 | * | 9/1998 | Mills ..................................... 370/522 |

* cited by examiner

Primary Examiner—Ayaz R. Sheikh
Assistant Examiner—Frantz Blanchard Jean
(74) Attorney, Agent, or Firm—Ronald V. Davidge; Richard A. Tomlin

(57) ABSTRACT

A pair of communications adapters each include a number of digital signal processors and network interface circuits for the attachment of a multi-channel telephone line. A bus connecting the communications adapters can carry data between a network line attached to one of the adapters and the digital signal processors of the other adapter. The digital signal processors on each card are connected to a host, or controller, processor. Each digital signal processor interrupts its host processor by transmitting an interrupt control block as data to a data memory of the host processor, and by subsequently sending an interrupt causing the host processor to examine the data memory. Preferably, the interrupt control block includes data representing a number of requested interrupts.

14 Claims, 5 Drawing Sheets

APPARATUS INCLUDING A HOST PROCESSOR AND COMMUNICATIONS ADAPTERS INTERCONNECTED WITH A BUS

This is a division of U.S. patent application Ser. No. 08/944,209 filed Oct. 6, 1997, which issued on Oct. 19, 1999, as U.S. Pat. No. 5,968,158.

BACKGROUND OF THE INVENTION

1. Field of the Invention

This invention relates to a time division multiplexing communications adapter, and more particularly to such an adapter, including a number of digital signal processors, which may be used as a member of an interconnected group of such adapters.

2. Background Information

A conventional DSP (Digital Signal Processor) based communications system having a capability of handling large numbers of channels on one or more network lines includes a line card to which one or more external lines may be attached and one or more DSP cards which can be used for adding processor resource to the line card. However, since network lines can carry varying numbers of information channels, and since information networks can be expected to grow and otherwise change in a number of ways, a problem with this approach is its lack of flexibility. A user of this type of system cannot vary the number of lines which can be attached to his system to match his processing capability without increasing his number of line cards.

What is needed is a communications card which has both line adapter functions and DSP resources, with such a card being readily connectable with a second communications card to increase the DSP resources available for a network line attached to the second communications card.

What is needed is a communications card which communicates with an external processor, such as the processor of a host controller card, or a system unit processor, by means of interrupts. The communications adapter may have a number of DSPs. Due to the real-time nature of processor operation, the overhead of handling interrupts may become a serious burden. When a single host, or controller, processor is connected to many DSPs in the communications card, a major overhead problem for the host processor is due to a need for context switching and due to a need to save and restore all registers for each interrupt. Problems with this burden are particularly significant when the host processor is a RISC configuration having a large number of registers to be saved.

What is needed is a method for bundling a number of interrupts to the host processor from a single DSP, so that they can be handled together.

3. Description of the Prior Art

U.S. Pat. No. 4,991,169 describes the use of a dual digital signal processor (DSP) to provide real-time links between multiple time division channels of a digital carrier system (e.g. T-1) and a host data processor. Operating only on digital signals, internally and at its interfaces to the carrier and host systems, the DSP exchanges data and control signalling information with the carrier system and data and control information with the host processor, converting the data in passage to different digital forms. At the interface to the carrier system, signals are received and transmitted in a form adapted to diverse terminal equipment of users, remotely linked to the carrier system via the switched public network. At the host interface, signals are transmitted and received in a form suited to the data process requirements of the host system (e.g. data bytes directly representing alphanumeric characters. The DSP acts as the equivalent of multiple different types of modems in performing required conversions. The DSP may also perform processing services in order to reduce the processing burden on the host system (e.g. parity checking of data, detection of specific character functions in data or specific tones in audio signals, and selective muting of voice to host storage for voice mail applications.

U.S. Pat. No. 5,553,293 describes an interprocessor interrupt unit (IIU) for processing interrupts between a remote processor and a host processor on a multiprocessor system. The IIU off-loads tasks involved in processing interrupts from the operating kernel of the remote processor. Control blocks of interrupt information and commands are stored in Data Random Access Memory (DRAM) by the remote processor. The remote processor packs a buffer of control block memory addresses in DRAM for the IIU to access to retrieve the control blocks from DRAM. The IIU receives a control block and loads the control block into registers. The IIU then issues an interrupt request to the host processor. The host processor receives the interrupt request and indicates to the IIU that the interrupt has been processed. The IIU then notifies the remote processor that the interrupt has been processed. The IIU may be programmed to notify the remote processor of completion either by an interrupt or by setting a status flag in the DRAM.

U.S. Pat. No. 5,572,695 describes a digital signal processing system including first and second logical memory mapping units coupled to first and second digital processors, respectively, and to a data storage unit. The first and second mapping units are operative to receive (i) first and second logical addresses generated by the first and second digital processors respectively and (ii) first and second address mapping information respectively, and generate first and second physical addresses such that each of the digital processors can independently access any of a plurality of memory locations within the data storage unit.

SUMMARY OF THE INVENTION

It is a first objective of the present invention to provide an adapter in which DSPs resident on multiple cards communicate through PCI and TDM busses, so that the work of processing data transmitted at a primary rate can be easily distributed among two or more DSPs.

It is another objective of the present invention to provide a TDM (time division multiplexing) interface for data from an on-card primary interface or an off-card source, such as similar adapters or a line card.

It is another objective of the present invention to allow channelized TDM traffic to be diverted to available DSPs in response to MIP (process speed) and memory requirements.

It is another objective of the present invention to provide a TDM interface having access to multiple primary interfaces.

It is another objective of the present invention to provide for communications between a host controller card and DSPs as well as among DSPs.

It is another objective of the invention to provide a system in which interrupt process can optionally be bundled according to system needs.

It is another objective of the invention to provide for the use of a PCI (Peripheral Component Interconnect) bus by both the host controller and the system unit processor, allowing interrupts to pass between DSPs and the host controller as well as the system unit processor.

In accordance with one aspect of the invention, there is provided first and second communications adapters and a first bus extending between these communications adapters. Each of the communications adapters includes network interfacing circuits for connection of a telephone network line, time division multiplexing circuits combining a number of signals for transmission along the telephone line, time division demultiplexing circuits separating a number of signals received from the telephone network line, and a number of digital signal processors connected to the time division multiplexing circuits and to the time division demultiplexing circuits. The first bus connects the number of digital signal processors of the first communications adapter with the time division multiplexing and demultiplexing means of the second communications adapter, and connects the number of digital signal processors on the second communications adapter with the time division multiplexing and demultiplexing circuits of the first communications adapter.

DETAILED DESCRIPTION

Figure 1:
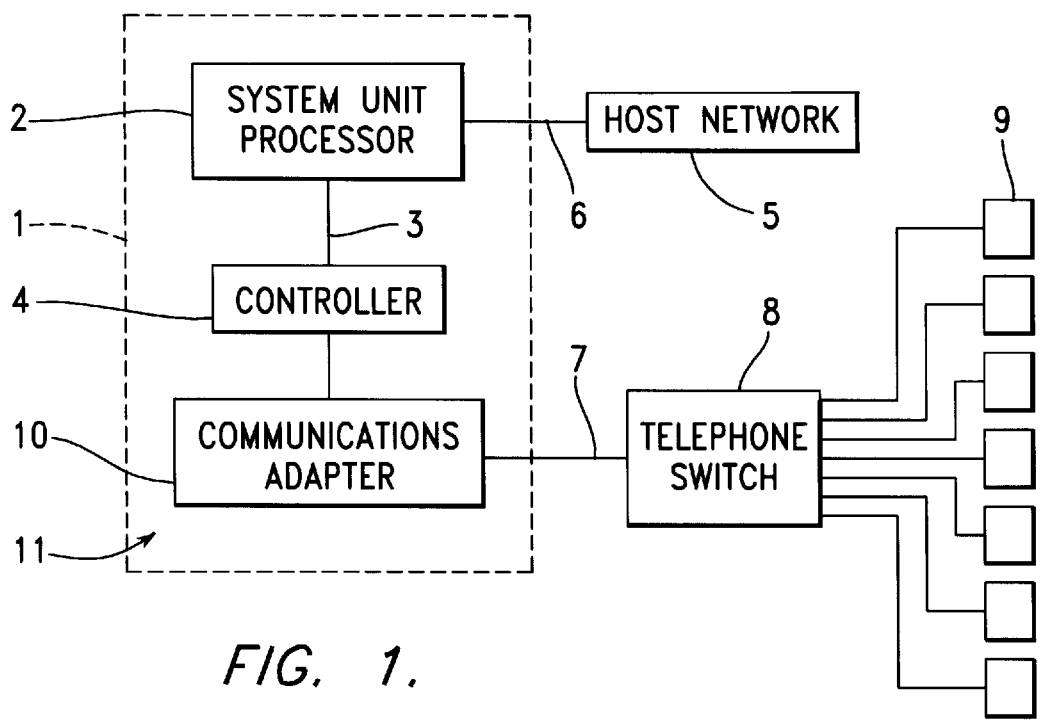
FIG. 1 is a schematic view of an ISDN server application using a communications adapter built in accordance with the present invention.

FIG. 1 is a schematic view of an ISDN server application using a communications adapter built according to the present invention. In this application, a computer system 1 includes a system unit processor 2 having a PCI (Peripheral Component Interconnect) bus 3 extending to a controller 4. Data is transferred between a host network 5, such as a database service network, and the computer system 1 over a LAN 6 (Local Area Network). Also connected to the computer system 1 is an ISDN network line 7, which extends through the public switched telephone network to a switch 8, which is part of this telephone network. The ISDN network line 7 is, for example a T1 line in the United States or an E1 line in Europe. At the switch 8, signals from the ISDN network line 7 are divided among a number of devices 9, which may be telephones, computing devices, or combinations thereof.

In the computing system 1, the ISDN line 7 is connected to a communications adapter card 10. A single ISDN subsystem 11 consists of a single card pair, with a communications adapter card 10 plugged into a controller card 4, providing modem or other TDM voice-related functions within an ISDN primary rate interface for a personal computer having a PCI bus. Such a single card pair subsystem 11 can handle 30 ISDN B channels, making use of the full ISDN B channel bandwidth of 64 Kbps (killobits) per second while communicating with remote digital devices. Alternatively, a single card pair subsystem 11 can provide for 15 connections to remote analog modems at data rates up to 56 Kbps when communicating with remote analog modems. The actual number of channels which can be connected in this way may vary somewhat from these numbers, depending on the characteristics and limitations of the public switched telephone network as well as on the capabilities of the ISDN subsystem 11. The computing system 1 may be, for example, an IBM 7588 industrial computer, having a PCI bus 3 which can be connected to multiple ISDN subsystems 11, each of which is connected through an ISDN network 7 to a separate ISDN network. The adapter card 10 may be used to process data signals, voice signals requiring speech synthesis or speech recognition, or video signals in a videoconferencing application.

Figure 2:
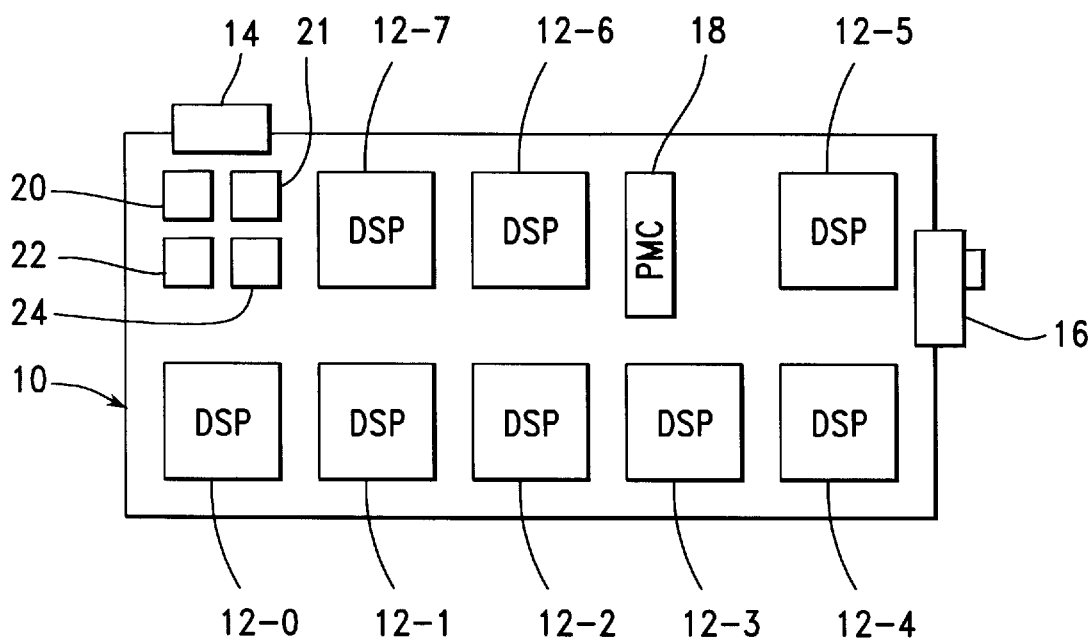
FIG. 2 is a diagrammatic view of the communications adapter card of FIG. 1.

FIG. 2 is a diagrammatic view of a communications adapter card 10 built in accordance with the present invention. This card 10 includes eight digital signal processor (DSP) subsystems 12-0 through 12-7, together with provisions for bus connections through an SC-bus connector 14, an E1/T1 interface connector 16, to which the ISDN network line 7 (shown in FIG. 1) is connected, and a PMC (PCI Mezzanine Card) PCI connector 18, by which the communications card 10 is connected as a daughter card to the controller card 4 (also shown in FIG. 1). Other major components are an SC-bus switch 20, supporting an SC-bus interface, configured according to SCSA (Signal Computing System Architecture) requirements, through the SC-bus connector 14, a serial to parallel interface 21, and a network interface including a frame aligner 22 and a driver/receiver 24.

Figure 3:
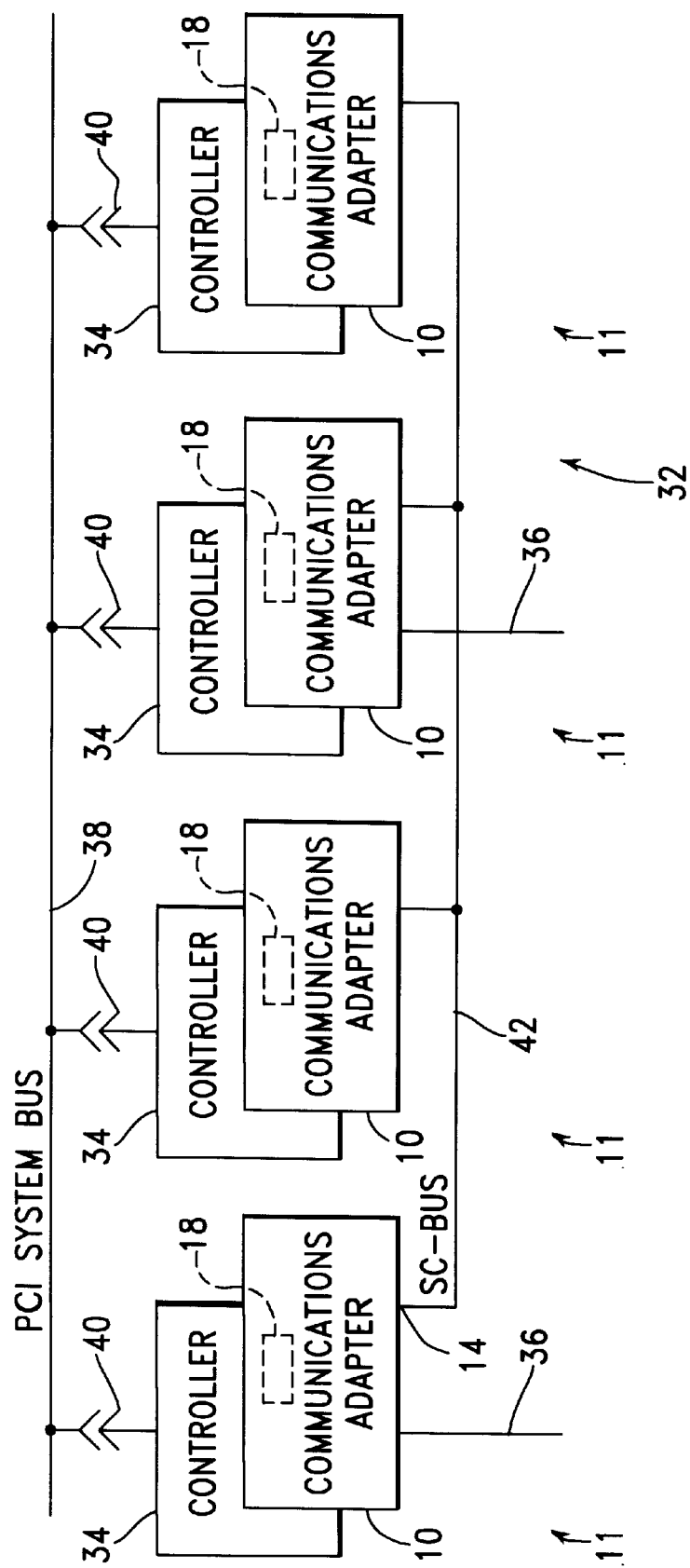
FIG. 3 is a schematic view of a communications configuration including four of the communications adapter cards of FIG. 2.

FIG. 3 is a schematic view of a communications configuration 32, built in accordance with the present invention, in which four of the communications adapter cards 10 of FIG. 2 are individually connected to four associated controller cards 4. This configuration supports two ISDN modem interfaces 36. The controller card 4 is, for example, an IBM PCI-960 Base Controller. Each controller card 4 fits into a card slot of a personal computer supporting a PCI bus 38, which is provided through a connection 40. A PCI bus connection is also made between each controller card 4 and its associated communications adapter card 10 through a PMC PCI connector 18. The communications adapter cards 10 are also interconnected through an SC-bus 42, extending through a ribbon cable atop the cards 10, 4, to be connected through SC-bus connectors 14. In the example of FIG. 3, two adjacent ISDN subsystems are linked to handle 60 ISDN B channels, 30 connections to remote analog modems, or various combinations thereof. In FIG. 2, two such linked pairs of ISDN subsystems are shown, each of which has a single connection to an E1 or T1 line 7.

Referring to FIGS. 2 and 3, the eight DSP subsystems 12 on each communications adapter card 10 provide modem functions from 300 bps (bits per second) to 56 Kbps for each of fifteen ISDN B channels within the ISDN interface 36. Two card-pair subsystems 11 are thus needed for 30 ISDN B channels. Each DSP subsystem 12 provides modem data pumping and protocol processing functions for two analog modem channels, or data and voice processing functions for up to four ISDN digital channels. All eight DSP subsystems 12 on the card 10 share a common TDM port, dropping and inserting their data at their assigned time slots.

Thus, in the configuration of FIG. 3, twice as many card-pair subsystems 11 are required for the attachment of a single ISDN network line 36, as in the configuration of FIG. 1. However, in the configuration of FIG. 3, twice as much processing resources are available for each ISDN network line 36 as for the lines 7 of FIG. 1. This additional processing capability may be used to service additional remote devices or terminals, or to process more complex algorithms for each channel. Again, the actual number of devices which can be connected depends on the capabilities of the telephone network as well as on the capabilities of the subsystems 11.

Figure 4:
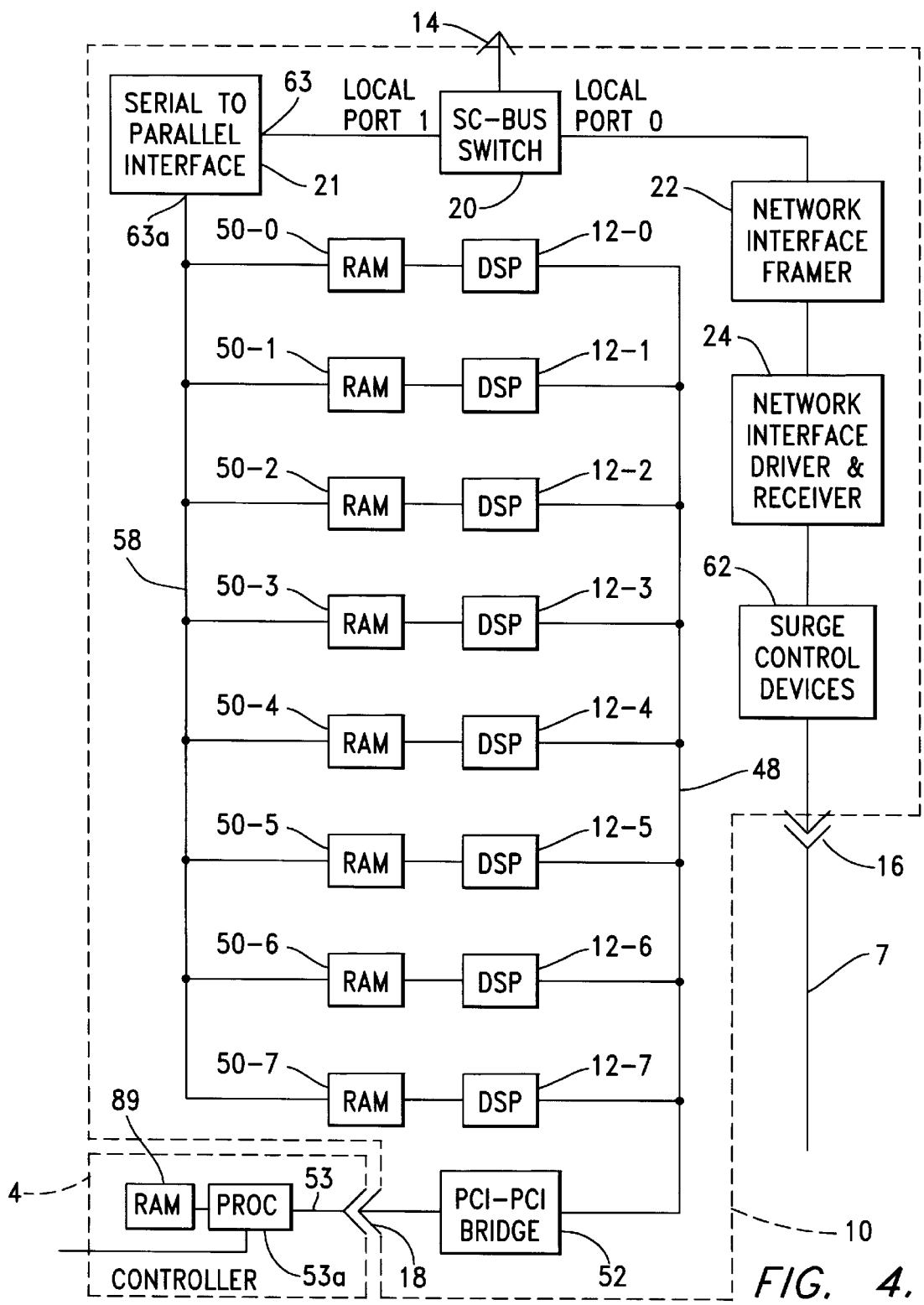
FIG. 4 is a functional block diagram of the communications adapter card of FIG. 2, particularly showing the routes of data flow.

FIG. 4 is a functional block diagram of the communications adapter card 10 of FIG. 2, particularly showing the routes of data flow. Each DSP subsystem 12 is connected to a PCI bus 48 extending along the card 10, and to a two-port data RAM 50 which is provided as a transmit/receive buffer for the corresponding DSP subsystem 12. Each 2-port data RAM 50 is a 1K×8 high-speed static RAM device, such as a Cypress CY7C131 memory module. The PCI bus 48 is connected through a PCI—PCI bridge circuit 52 to a bus 53 extending through the PCM PCI connector 18 into the controller card 4. The PCI bus 48 is a synchronous 32-bit I/O interface running at 33 Mhz. Interrupts A and B, as defined by the PCI local bus architecture, are used, with the DSP subsystem 12-0 connected to interrupt line A, while the DSP subsystems 12-1 through 12-7 are tied together on interrupt line B. All interrupt functions between these DSP subsystems 12 and the controller card 4 are controlled by a processor 53a of the controller card 4, which is, for example, an Intel 80960 processor.

The PCI—PCI bridge circuit 52 electrically isolates the PCI bus 48 from the PCI bus 53 and provides arbitration for the eight DSP subsystems 12 as they request busmaster service. This bridge circuit 52, may each be, for example, a DEC 21150 PCI—PCI Bridge chip, which can handle up to nine devices. The bridge circuit 52 includes a memory space which is divided into standard bridge configuration registers and device-specific configuration registers. The device-specific registers, which are not needed for standard implementations between PCI busses, are not programmed for this application. The standard configuration registers are controlled by the kernel of the controller card processor 53a.

The 2-port data RAM devices 50 are individually connected through an 8-bit data channel 58 to a serial to parallel TDM interface chip 21, which may be, for example, a Mitel MT8920B interface chip. This interface chip 21 is in turn connected to LOCAL PORT 1 of SC-bus switch 20, which may be, for example, a VLSI SC4000 interface chip. This bus switch 20 is in turn connected to the SC-bus connector 14.

The E1 or T1 line 7 is attached to the communications adapter card 10 through the network interface connector 16. Lines from this connector 16 are routed through a network interface including surge control devices 62, network interface driver and receiver 24, and network framer 22. The network interface driver and receiver 24 is, for example, a Siemens PRACT (Primary Rate Access Clock and Transceiver) PEB 22320 chip. The network framer chip 22, is, for example, be a Siemens ACFA (Advanced CMOS Frame Aligner) PEB 2035 chip. The network interface driver and receiver 24 generates the primary clock interface for all of the TDM hardware modules, such as network framer chip 22, the serial to parallel interface 21, and the SC-bus switch 20. The network interface driver and receiver 24 and the network framer chip 22 are controlled by DSP subsystem 12-0, in a manner which will be described in reference to FIG. 5. The network interface circuits 22, 24, 62 also include transformers for receive and transmit circuits, termination resistors, and diode clamps. While changes in programming can cause the communications adapter 10 to operate in alternate modes as required by attachment to an E1 or T1 line, changes in a hardware configuration of network impedance matching resistors are also required between these modes. Serial transmit and receive lines from the network interface circuit 60 are connected to LOCAL PORT 0 of the SC-bus switch 20.

The communications adapter card 10 supports an SCSA (Signal Computing Systems Architecture) interface at its top edge along a 26-pin connector 14. This interface supplies all of the necessary clocking signals, and sixteen serial data signals for card-to-card communications. This interface has the capability of eight full-duplex T1 or E1 network lines. Additionally, the number of timeslots per frame is programmable to 32 or 64. Preferably, this parameter is programmed to 32 timeslots per frame.

The SC-bus switch 20 supports four local serial port connections, of which only LOCAL PORT 0 and LOCAL PORT 1 are used. The switching function is implemented through two RAM memories, with a destination routing memory controlling data movement from the local ports to the SC-bus 42 (shown in FIG. 3), while a source routing memory controls data movement from the SC-bus 42 to the local ports. The timeslot number serves as the address to either routing memory, while the data stored in the routing memory becomes the switched timeslot number. Actual timeslot serial data is loaded in frame buffers and routed through multiplexing circuits controlled by the destination and source routing memories. There is a one-frame delay for data traveling through the SC-bus switch 20 in either direction.

The SC-bus switch 20 is the main clock source for all TDM clock functions, receiving a reference clock from the network interface driver and receiver module 24, which is synchronized to an incoming data stream received from the network transmission line 7. From this reference clock, the SC-bus switch 20 generates all main SC-bus clocks and all of the local port clocks. The local ports have a 4.096-Mhz bit clock and an 8-Khz frame synch-clock, which are supplied to the network interface framer 22 and to the serial to parallel interface 21. When several communications adapter cards 10 are connected by the SC-bus 42, as shown in the example of FIG. 3, the SC-bus switch 20 of one of the cards 10 is programmed to be the master clock source, while the switches 20 on the other cards 10 are programmed to operate as slaves. In this way, the TDM data paths on all the cards 10 are synchronized to a single network cable 7. If this single clock source should fail, the SC-bus switches 20 have an ability to switch to another such switch 20 as an alternative master clock source, supporting a soft recovery mode of operation.

The serial to parallel interface chip 21 provides the connection between LOCAL PORT 1 of the SC-bus switch 20 and one port of each of the eight two-port 1K×8 RAM buffers 50. Serial transmit and receive data between the serial to parallel interface chip 21 and the SC-bus 20 is clocked at an E1 line speed of 2.048 Mbits per frame and 8000 frames per second. Data is shifted into one buffer 50 and out of another buffer 50 in full duplex mode. Separate transmit and receive 2-port RAM buffers (not shown) within the serial to parallel interface chip 21 each have one port tied to a separate serial port 63, while the other port of both these buffers is tied to a common parallel port 63a. One byte of transmit data is read from the transmit buffer RAM one channel time before it is shifted out the serial port 63 of this chip 20, and one byte of receive data is written to the receive buffer RAM one channel time after it is shifted in from the serial port 63. The parallel bus 58 extending between the parallel interface chip 21 and the RAM buffers 50 provides an 8-bit data bus and a 5-bit address bus, a WRITE ENABLE pulse, and a READ ENABLE pulse. This interface allows direct connection of the eight RAM buffers 50, being timed to read one byte and write one byte of parallel data as the serial interface from the serial to parallel interface chip 21 is shifting four bits in or out.

The parallel interface port 63a writes all 32 channels of receive data for every frame into all eight two-port RAM buffers 50 simultaneously. In this way, all eight DSP subsystems 12 have access to all received data. On the other hand, parallel transmit data is read from the transmit portion of a single two-port RAM buffer 50 at a time into the parallel interface port 63a.

Each 2-port static RAM buffer 50, being divided into transmit and receive buffers (not shown), stores eight consecutive frames of data to be transmitted or received. All 32 channels for each frame are allocated for both transmit and receive buffers. Each DSP subsystem 12 can access 256 bytes of receive buffer data and 256 bytes of transmit buffer data. The serial to parallel interface 21 requires a dedicated port to each of these buffers continuously. A 3-bit frame counter function is implemented in circuits associated with the DSP subsystem 12-0, which will be discussed in reference to FIG. 5. These three bits, together with the five address bits driven along bus 58 from the serial to parallel interface 21, provide for the selection which must be made among the transmit and receive buffers within the RAM buffers 50. The serial to parallel interface 21 can only read from the transmit buffers within the RAM buffers 50 and can only write to the receive buffers therein. All eight receive buffers are written simultaneously, but only one transmit buffer is read at a time.

The other, opposite port of each two-port RAM buffer 50 is dedicated to an associated DSP subsystem 12, which can only write to the transmit buffer within the RAM buffer 50 and read from the receive buffer therein.

Thus, referring to FIGS. 3 and 4, data received from the transmission line 7 moves as serial data from the network interface connector 16, through network interface devices 24, 22 into the LOCAL PORT 0 of SC-bus switch 20 and outward from the LOCAL PORT 1 of this switch 20 to the serial to parallel interface 21, where it is converted into a parallel format, in which it is carried into the RAM buffers 50. Data from these buffers 50 then flows through the associated DSP subsystems 12 to the internal PCI bus 48, and into the controller 4 through PCI bus 53. Alternately, the data received through the LOCAL PORT 0 in the SC-bus switch 20 is switched to be transmitted through the connector 14 and the SC-bus 42, to be processed through another communications controller 10 in the computing system.

Data to be transmitted on the transmission line 7 flows into the communications adapter 10 through PCI bus 53 and through PCI bus 48 to the DSP subsystems 12. This data is then written into the associated RAM buffers 50, to be sent therefrom, in a parallel format, along the 8-bit data bus 58, to the serial to parallel interface 21. In this interface 21, the data is converted to a serial format, to be directed through SC-bus Switch 20 into the network interface devices 22, 24. This data is then driven into the network line 7 through interface connector 16. Alternatively, the SC-bus switch 20 can direct data received through LOCAL PORT 1 from the serial to parallel interface 21 outward through the SC-bus connector 14 to the SC-bus 42, to be transmitted from a network line 7 connected to another communications adapter 10.

Figure 5:
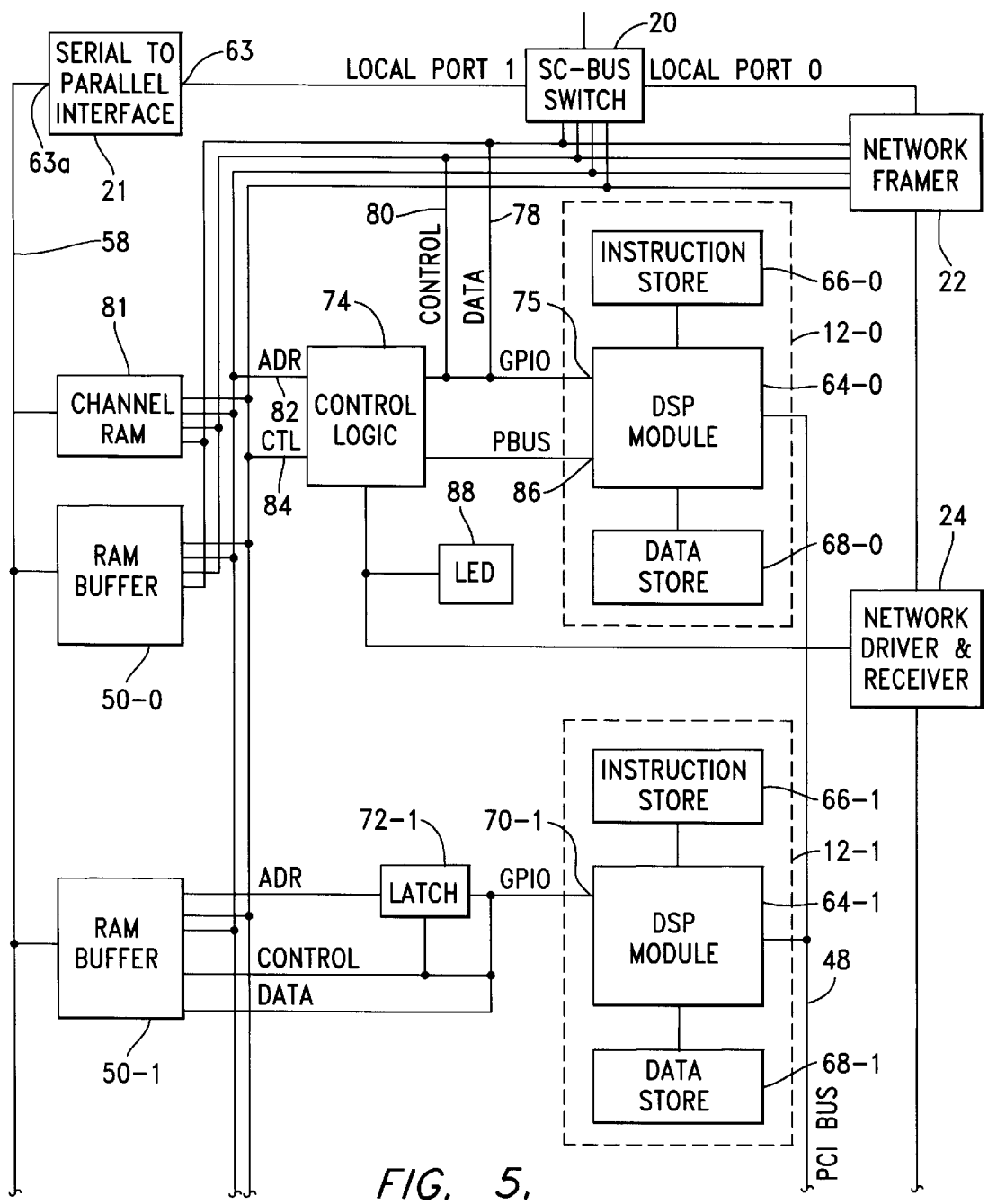
FIG. 5 is a block diagram of two DSP subsystems in the communications adapter card of FIG. 2, together with associated circuits.

FIG. 5 is a block diagram of DSP subsystems 12-0, 12-1 and associated circuits. This diagram also applies to six other DSP subsystems 12-2 through 12-7, which are identical to subsystem 12-1. The DSP subsystem 12-1 includes a DSP module 64-1, which is, for example, an MWAVE 3780P module, 128K×24 instruction storage 66-1, and 128K×16 data storage 68-1. The DSP module 64-1 drives the static RAM buffer 50-1 with its 16-bit GPIO port 70-1 and with an external 8-bit address latch module 72-1. The control code executing in DSP module 64-1 can only write to the transmit buffer area in RAM buffer 50-1, and can only read from the receive buffer area in this buffer 50-1.

The sixteen bits of the GPIO port 70 of each DSP module 64 can be programmed to be input only, output only, or bidirectional. A single DSP instruction can change the polarity of output bits, read the current state of the 16 bits, or tri-state a set of bits. Since only a single function can be performed with each DSP instruction, it requires a series of instructions to perform a timed sequence controlling an external device. In the communications adapter card 10 (shown in FIG. 4) nine DSP instructions are required to read and write a single address in the two-port RAM buffer. Each DSP subsystems 12-1 through 12-7 only control two devices, the associated RAM buffer 50 and a frame counter (not shown). Thus, hardware for only these two devices is implemented in connection with these subsystems 12-1 through 12-7. However, the DSP code executed within these subsystems is identical to that of the DSP subsystem 12-0, which controls several additional devices. Each DSP subsystem 12 determines which devices to control by reading a subsystem ID value from its DSTORE memory space.

Again, the DSP subsystem 12-0 includes a DSP module 64-0, 128K×24 instruction storage 66-0, and 128K×16 data storage 68-0. The DSP subsystem 12-0 also has an associated static RAM buffer 50-0, but its control is handled through an external control logic module 74, which may be implemented, for example, using a PAL (Programmable Array Logic) chip from Advanced Micro Devices. The control logic module 74 also provides ADDRESS and CONTROL outputs through which the DSP subsystem 12-0 establishes read/write control of the SC-bus switch 20, and the network interface framer 22. The DSP module 64-0 uses its parallel, bidirectional GPIO port 75 as a data bus 78 and a control bus 80 to read and write to registers in the network framer 22, in the SC-bus switch 20, in a two-port channel RAM circuit 81, and in the two-port data RAM buffer 50-0. A read or write to a register within the network framer 22 requires a sequence of DSP instructions which manipulate the GPIO port 75 to match the required timings for an I/O cycle of the network framer 22. The GPIO port 75 also supports an interrupt function to monitor signalling and error status from the network framer 22. Address lines 82 and additional control lines 84 also extend to these circuits 20, 22, 81, and 50-0 from control logic module 74. The address lines 82 and control lines 80, 84 are also extended to two-port data RAM buffers 50-1 through 50-7, so that the DSP subsystem can control operation of these devices. To prevent read/write access conflicts, each DSP subsystem 12-0 through 12-7 can monitor the value of a common frame counter within control logic 74. Each DSP subsystem 12 uses this information to avoid writing in locations in both the transmit and receive buffers of its associated RAM buffer 50, when these buffers are being used by the serial to parallel interface 21.

Control of the network interface driver and receiver 24 is established through the PBUS port 86 of the DSP module 64-0. This port 86 acts as an 8-bit slave ISA interface, with only write commands being needed to set latches in the control logic 74. The PBUS port 86 is self-clocking, requiring only one DSP instruction to issue a write command to the driver and receiver module 24, which only accepts write command from the PBUS port 86. A yellow/green LED 88 is also controlled in this way, providing a viable indication of the use of the communications adapter card 10, at its end, which can be seen at the rear of the computer 1 (shown in FIG. 1).

The two-port channel RAM module 81 is a single 1K×8 device controlled only by DSP subsystem 12-0. Only 64 locations are used within this RAM module 81, forming a first 32-location buffer used by the serial to parallel interface 21 (shown in FIG. 4) and a second 32-location buffer used by the DSP subsystem 12-0. These two buffers are separated by an address bit controlled by a ping pong latch. Since the polarities of the two outputs of the ping pong latch are always opposite one another, both port addresses never simultaneously include the same value, preventing read/write conflicts from both ports to a common internal array. The DSP subsystem 12-0 controls the state of the ping pong latch. When the DSP subsystem 12-0 is using one buffer, the serial to parallel interface 21 is using the other. When the state of the ping pong latch is flipped, the buffers are reversed. This operation allows the DSP subsystem 12-0 to pre-load or modify channel or subsystem site information before turning over this new or updated buffer information to the series-to-parallel interface 21.

The MWAVE 3780P module contains a 44 MIP ISP-5.6 DSP core which can access 128K of 24-bit instructions and 128K of 16-bit data storage. This module is a multifunction device containing PCI functions for DSP, UART, MIDI, Soundblaster, Soundblaster DMA Controller, and three PBUS parallel devices. In the example of the present invention, only the DSP device is configured for the PCI interface. Only in the DSP module 64-0, the three PBUS devices are used by the DSP core, but not by the PCI interface. There are three additional serial I/O ports available from each MWAVE module, but they are left unconnected, as they are not used. All of these additional peripheral interfaces and unused device functions are disabled and powered down through peripheral control and power management registers to minimize power consumption and to avoid resource conflicts.

Each DSP module 64 uses an internal clock generator driven by an external 33.8688 Mhz oscillator. This internal PLL (Phase-Locked Loop) clock generator is programmable, allowing instruction cycle rates from a minimum of 17 MIPs to a maximum of 44 MIPs. In the example of the present invention, all DSP modules 64-0 through 64-7 are set to run at 44 MIPs.

Referring again to FIG. 4, both the controller processor 53a and the DSP subsystems 12 are able to interrupt one another across the connected PCI busses 48,53. A single-threaded interrupting protocol is used within the system to prevent overruns. Four interrupt signals are supported by lines within a PCI bus. The DSP subsystem 12-0 is connected to INTERRUPT A, and the DSP subsystems 12-1 through 12-7 are all connected to INTERRUPT B, with INTERRUPTS C and D being neither used nor connected. When a DSP subsystem 12 wishes to interrupt the controller processor 53a, it writes to its own MSA address '8000 0060'h, the HBRIDGE interrupt register within the PCI—PCI bridge 52.

While the sixteen bits in the HBRIDGE interrupt register are conventionally used to represent up to sixteen different types of service, a DSP subsystem 12, operating in accordance with the present invention, sends a control block of data representing interrupt(s) to be requested into a predetermined area within the data memory 89 of the controller card 4 by means of a DMA (Direct Memory Access) process. Then, the DSP subsystem 12 sets any bit to send an interrupt through the PCI busses 48, 53. When the controller processor 53a receives this interrupt, it determines that DSP subsystem 12-0 has requested an interrupt if the interrupt is received on the INTERRUPT A line, or that one of the DSP subsystems 12-1 through 12-7 has requested an interrupt, if the interrupt is received on the INTERRUPT B line. According to a preferred version of the present invention, the control block of information sent to the data memory 98 of the control card is read by the controller processor 53a upon receiving an interrupt to determine, among other facts, which subsystem 12-1 through 12-7 has requested the interrupt. Otherwise, if the interrupt has been received on the INTERRUPT B line, the controller processor 53a reads the HBRIDGE interrupt register from each DSP subsystem 12-1 through 12-7, checking for '1'b bits.

While multiple interrupt requests from DSP subsystems 12 may be present, the controller processor 53a keeps track of which interrupt is being processed. At the end of an interrupt routine, the controller processor 53a writes to the HBRIDGE register in the particular DSP subsystem 12 whose interrupt request is active, a MASK of '0000'h. This write command clears the interrupt request. Otherwise, the DSP subsystem 12 may clear its HBRIDGE register after receiving an acknowledgment.

The controller processor 53a interrupts a particular DSP subsystem 12 by writing to an I/O decode address '8000 06A2'h, the Asynchronous Interrupt Register. This 16-bit register has two special bits, bits 4 and 5, which are assigned to work with the interrupt protocol of the communications adapter 10. Bit 4 is a COMMAND INFORMATION bit, which tells a DSP subsystem 12 that a particular type of control block has been assured by the controller processor 53a. The DSP subsystem 12 uses this information to fetch the actual control block from the memory of the controller 4, and to determine how the data should be processed. Bit 5 is a handshake acknowledgement for interrupts from a DSP subsystem 12 to the controller processor 53a, indicating that the controller processor 53a has completed servicing a current interrupt from a DSP subsystem 12. Overruns are prevented, since interrupts from the DSP subsystem 12 are serviced in a single-threaded manner. Bit 5 interrupts operate in a request-response mode, while Bit 4 interrupts operate in a request-only mode. When the DSP subsystem 12 goes to the vector for either a Bit 4 or a Bit 5 interrupt, the bit turns off. The controller processor 53a does not poll this condition to arm the interrupt again; a standby area is checked to insure all current commands are cleared.

According to a preferred version of the present invention, a number of interrupts from each DSP subsystem 12 to the controller processor 53a, in the form of interrupt blocks of data, are collected, or bundled, before they are sent to the controller processor 53a, to further reduce the bandwidth required within this processor 53a for interrupt processing.

Figure 6:
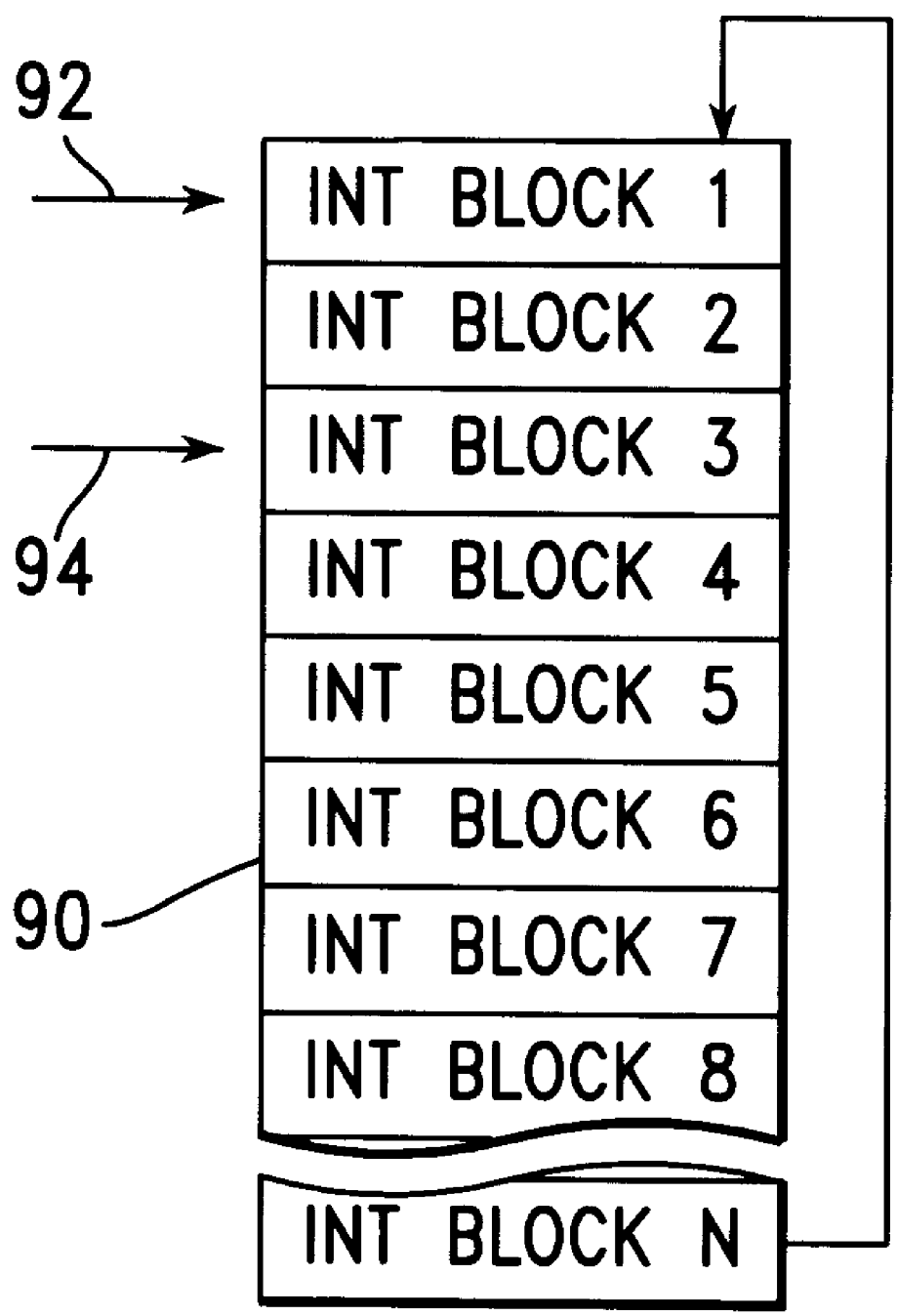
FIG. 6 is a schematic view of a linked list of interrupt blocks formed within the data store of a DSP subsystem in the communications adapter card of FIG. 2.

FIG. 6 is a schematic view of a linked list 90 of interrupt blocks formed within the data store 68 (shown in FIG. 5) of each DSP subsystem 12. This list is accessed by a first pointer 92, which points to the last interrupt which was sent from the particular DSP subsystem to the controller processor 53a (shown in FIG. 4) and by a second pointer 94, which points to the location at which a new interrupt may be written. The interrupt block currently in the location to which the second pointer 94 points has already been transmitted to the controller processor 53a. Thus, at any time, the interrupt blocks remaining to be sent to the processor 53a are those blocks in the list between the first pointer 92 and the second pointer 94. The pointers 92, 94 move along the list in a circular fashion, returning from the last INT BLOCK "N" to the first INT BLOCK 1.

In a first version of operation, after an interrupt block is sent to the processor 53a, no more interrupt blocks are sent until an acknowledgement of the prior interrupt is returned. The first pointer is held at the location indicating the location of the prior interrupt. Until this prior interrupt has been acknowledged, interrupt blocks are written as they are called for at the location of the second pointer, which is moved downward after each new block is written. When this prior interrupt is acknowledged, the interrupt blocks between the first and second pointers (if any) are written by the DSP subsystem 12 to the data memory of the controller 4, using a DMA capability. After each interrupt block is accessed for writing, the first pointer is moved downward, until the second pointer is reached.

In a second version of operation, the DSP subsystem 12 tracks the number of interrupt blocks which have been written within the list 90 since the last interrupt block was sent to the processor 53a. When this list reaches a predetermined limit, the interrupt blocks are written by means of DMA to the memory of the controller card.

In a third version of operation, the DSP subsystem 12 tracks the elapsed time following the transmission of a prior interrupt block, or the time after the first untransmitted interrupt is written into the list 90. When this time reaches a predetermined level, the interrupt blocks (if any) between the first and second pointers are written by the DSP subsystem 12 to the data memory of the processor 4.

These methods may be used in combination. For example, interrupt blocks may be sent to the processor 53a upon receipt of an acknowledgement, only if a sufficient number of such blocks, over a predetermined limit, have accumulated between the pointers 92, 94. In this way, the frequency with which the processor 53a is interrupted is not needlessly increased because acknowledgements are quickly returned. Also, interrupt blocks may be sent to the processor 53a either upon acknowledgement of a prior interrupt or when the time following the transmission of a prior interrupt exceeds a predetermined maximum, to control interrupt latency.

With any of these versions, or combinations thereof, a power-on or other session beginning process may include the transmission of a single interrupt to get the process started. After one or more interrupt blocks are sent by DMA, an interrupt is sent along an interrupt line of the PCI busses 48, 53 (shown in FIG. 4), indicating that the processor 53a should check the appropriate locations with its data memory 89.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus comprising:
    first and second communications adapters, with each said communications adapter including network interface means for connection to a telephone network line, time division multiplexing means combining a plurality of signals for transmission along said telephone network line, time division demultiplexing means separating a plurality of signals received from said telephone network line, switching means, and a plurality of digital signal processors connected through said switching means to said time division multiplexing means and to said time division demultiplexing means; and
    a first bus extending between said switching means of said first and second communications adapters, connecting said plurality of digital signal processors of said first communications adapter with said time division multiplexing and demultiplexing means of said second communications adapter, and connecting said plurality of digital signal processors on said second communications adapter with said time division multiplexing and demultiplexing means of said first communications adapter.

2. The apparatus of claim 1, additionally comprising:
    a host processor connected to said first communications adapter;
    a host data memory accessible by said host processor;
    a data bus extending between a digital signal processor within said plurality thereof of said first communications adapter and said host processor; and
    an interrupt line extending between said digital signal processor and said host processor,
    wherein said digital signal processor interrupts said host processor by sending an interrupt control block including interrupt information along said data bus to said host data memory and by sending an interrupt along said interrupt line.

3. The apparatus of claim 2, wherein said interrupt control block includes a plurality of interrupt blocks, each of which describes an interrupt request.

4. The apparatus of claim 1, additionally comprising a third communications adapter including switching means and a plurality of digital signal processors, wherein said first bus additionally extends to said switching means of said third communications adapter, connecting said time division multiplexing means of said first and second communications adapters with said plurality of digital signal processors of said third communications adapter.

5. The apparatus of claim 4, additionally comprising a fourth communications adapter including switching means and a plurality of digital signal processors, wherein said first bus additionally extends to said switching means of said fourth communications adapter, connecting said time division multiplexing means of said first and second communications adapters with said plurality of digital signal processors of said fourth communications adapter.

6. The apparatus of claim 1, wherein said switching means of said first and second communications adapters support sending a plurality of serial data signals across said first bus.

7. The apparatus of claim 6, wherein
    said switching means of said first communications adapter receives a reference clock signal from said network interface means of said first communications adapter, and
    said switching means of said first communications adapter provides a clock signal driving all time data multiplexing functions of said apparatus.

8. The apparatus of claim 1, additionally comprising:
    a system unit processor, and
    a system bus connecting each said communications adapter with said system unit processor.

9. The apparatus of claim 1, additionally comprising:

an internal bus extending within each said communications adapter connecting digital signal processors in said plurality thereof;

an individual controller processor connected with each said internal bus, a system unit processor; and a system bus connecting said system unit processor with each said individual controller processor.

10. Apparatus comprising:

a first communications adapter, including network interface means for connection to a telephone network line, time division multiplexing means combining a plurality of signals for transmission along said telephone network line, time division demultiplexing means separating a plurality of signals received from said telephone network line, switching means, and a plurality of digital signal processors connected through said switching means to said time division multiplexing means and to said time division demultiplexing means; and a second communications adapter including switching means and a plurality of digital signal processors, connected to said switching means, and a first bus extending between said switching means of said first and second communications adapters, connecting said time division multiplexing means of said first communications adapter with said plurality of digital signal processors of said second communications adapter.

11. The apparatus of claim 10, wherein said switching means of said first and second communications adapters support sending a plurality of serial data signals across said first bus.

12. The apparatus of claim 11, wherein said switching means of said first communications adapter receives a reference clock signal from said network interface means of said first communications adapter, and said switching means of said first communications adapter provides a clock signal driving all time data multiplexing functions of said apparatus.

13. The apparatus of claim 10, additionally comprising:

a system unit processor, and a system bus connecting each said communications adapter with said system unit processor.

14. The apparatus of claim 10, additionally comprising:

an internal bus extending within each said communications adapter connecting digital signal processors in said plurality thereof;

an individual controller processor connected with each said internal bus, a system unit processor; and a system bus connecting said system unit processor with each said individual controller processor.

* * * * *